(12) United States Patent
García et al.

(10) Patent No.: US 8,733,077 B2
(45) Date of Patent: May 27, 2014

(54) TRANSMISSION LINE GUIDE CHAINS AND DIVIDERS FOR TRANSMISSION LINE GUIDE CHAINS

(71) Applicant: Hewlett-Packard Development Company, L.P., Houston, TX (US)

(72) Inventors: Daniel Gutiérrez García, Barcelona (ES); Lorena Fernández Llorens, Barcelona (ES); Ignacio Picatoste Olloqui, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/645,114

(22) Filed: Oct. 4, 2012

(65) Prior Publication Data

US 2014/0096499 A1     Apr. 10, 2014

(51) Int. Cl.
*F16G 13/16* (2006.01)

(52) U.S. Cl.
USPC ............... 59/78.1; 59/900; 248/49; 248/51

(58) Field of Classification Search
USPC .................. 59/78.1, 900; 248/49, 51
See application file for complete search history.

(56) References Cited

U.S. PATENT DOCUMENTS

| 4,833,876 A |   | 5/1989 | Kitao et al. |         |
|---|---|---|---|---|
| 4,962,639 A | * | 10/1990 | Blase | 59/78.1 |
| 5,014,506 A |   | 5/1991 | Moritz |         |
| 5,220,779 A |   | 6/1993 | Tatsuta et al. |     |
| 6,176,072 B1 | * | 1/2001 | Weber | 59/78.1 |
| 6,178,732 B1 | * | 1/2001 | Weber | 59/78.1 |
| 6,182,995 B1 |   | 2/2001 | Wall |         |
| 6,864,425 B2 | * | 3/2005 | Ikeda et al. | 59/78.1 |
| 7,013,630 B2 | * | 3/2006 | Komiya | 59/78.1 |

FOREIGN PATENT DOCUMENTS

| JP | 9133257 A | 5/1997 |
| WO | WO-2004092614 A1 | 10/2004 |
| WO | WO-2010029090 A1 | 3/2010 |

OTHER PUBLICATIONS

Innovation@work, Innovation in Motion Tsubaki, KabelSchlepp:Tsubaki Kabelschlepp, Download Date : Oct. 3, 2012, < http://kabelschlepp.de/innovation/innovation-gb.html >.
Innovation@work2011, Innovation in Motion Tsubaki, Kabel Schlepp, 2011. <http://www.kabelschlepp.co.uk/pdf_gb/news2011_de_gb.pdf >.
Selection Basic Line Basic Line Vario Line, TKR, 2006, < http://www.brindzalaci.hu/download/tkr.pdf >.

* cited by examiner

Primary Examiner — David B Jones (57) ABSTRACT

A transmission line guide chain includes a plurality of connected chain links that define a through-passage to receive transmission lines. The chain links include a first chain link that defines a through-hole that forms a portion of the through-passage. A first divider is disposed in the through-hole and a second divider is removably seated on the first divider to provide a stack of dividers in the through-hole. The stack of dividers divides the through-hole into a plurality of compartments that can each receive at least one transmission line.

15 Claims, 10 Drawing Sheets

TRANSMISSION LINE GUIDE CHAINS AND DIVIDERS FOR TRANSMISSION LINE GUIDE CHAINS

BACKGROUND

Transmission line guide chains may comprise a plurality of connected chain links that define an axially extending through-passage to house transmission lines. The transmission lines may be hoses, tubes or cables. The hoses, tubes or cables are connected at one end to a source and at the other to a movable unit to transmit a fluid or electrical energy from the source to the movable unit. The fluid may be an actuating fluid, for example a pneumatic or hydraulic fluid, or a consumable fluid such as a coating fluid, for example an ink or paint. The electrical energy may be a source of electrical power, control signals or data. The movable unit may be an element of a robot or an element of a machine, for example a carriage of a printer. Transmission line guide chains restrain and guide the transmission lines they house as the movable unit moves relative to the source.

BRIEF DESCRIPTION OF THE DRAWINGS

In order that the invention may be well understood, some examples thereof, which are given by way of example only, will now be described with reference to the drawings in which.

DETAILED DESCRIPTION

Figure 1:
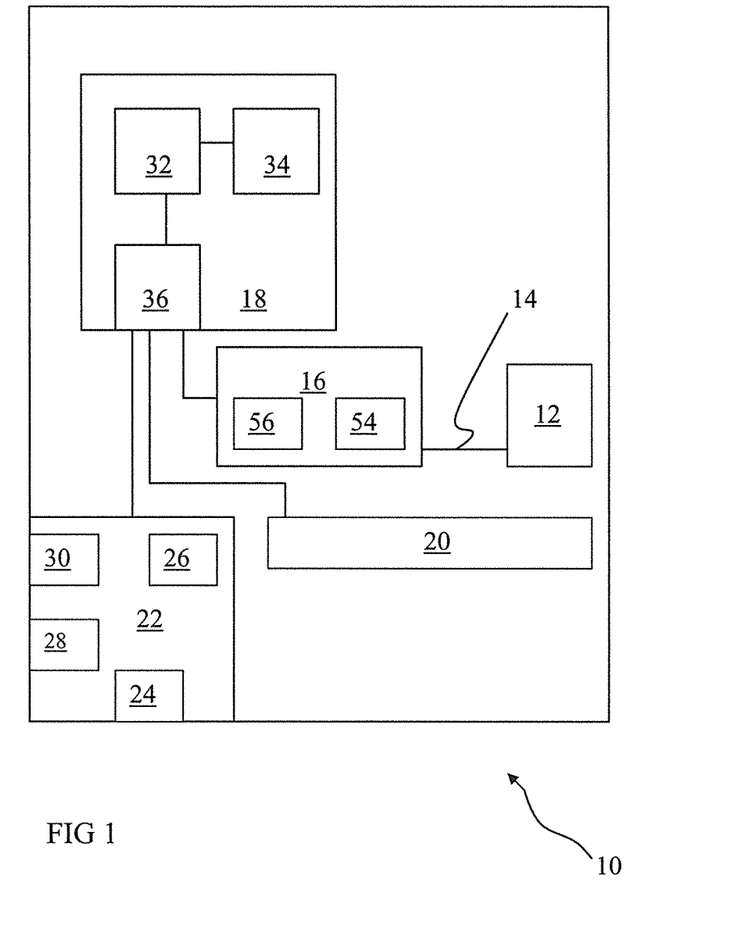
FIG. 1 is a schematic representation of a printing apparatus.

Referring to FIG. 1, an example of a printing apparatus 10 comprises a moveable unit in the form of a carriage 12, a delivery chain 14, a source 16, a controller 18, a media transport 20 and an I/O unit 22.

The I/O unit 22 may comprise one or more connectors 24 by which the printing apparatus 10 can be wire connected to a network, computer or other device so that it can receive print commands and data to be printed and via which the printing apparatus may output a response to the source of a received print command. The I/O unit 22 may also comprise a wireless module 26 via which print commands and data to be printed may be received and responses to received print commands can be transmitted to the command source. The I/O unit 22 may also comprise a manual input and display 28. The manual input and display 28 may comprise a keypad, switch buttons and the like to enable the manual input of commands. The manual input and display 28 may also comprise one or more indicator lights, a screen or the like for displaying printing apparatus activity. The I/O unit 22 may also comprise a module 30 configured to permit portable data carriers to be connected directly to the printing apparatus 10 to permit data that is to be printed to be read or downloaded directly from the data carrier. The module 30 may, for example, be configured to enable connection to one or more of the following portable data carriers: a portable hard drive, USB memory stick or a Compact Flash (I, II), MultiMediaCard (MMC), Secure Digital, Smart Media or xD Picture Card.

The media transport 20 may be configured to transport print media stepwise or continuously through the printing apparatus 10. The print media may, for example, be paper or a plastics sheet. The paper or plastics sheet may, for example, be drawn from a supply roll or supplied as individual sheets fed from a bin (not shown).

The controller 18 may comprise a processor 32, memory 34 and an I/O module 36. The I/O module 36 may be configured to receive data and commands from the I/O unit 22. The I/O module 36 may also be configured to output responses to the I/O unit, commands to the media transport 20 and commands and data to the carriage 12. The processor 32 and memory 34 may be configured to control the operation of the printing apparatus 10 in response to received commands and process data to be printed.

Figures 2, 3:
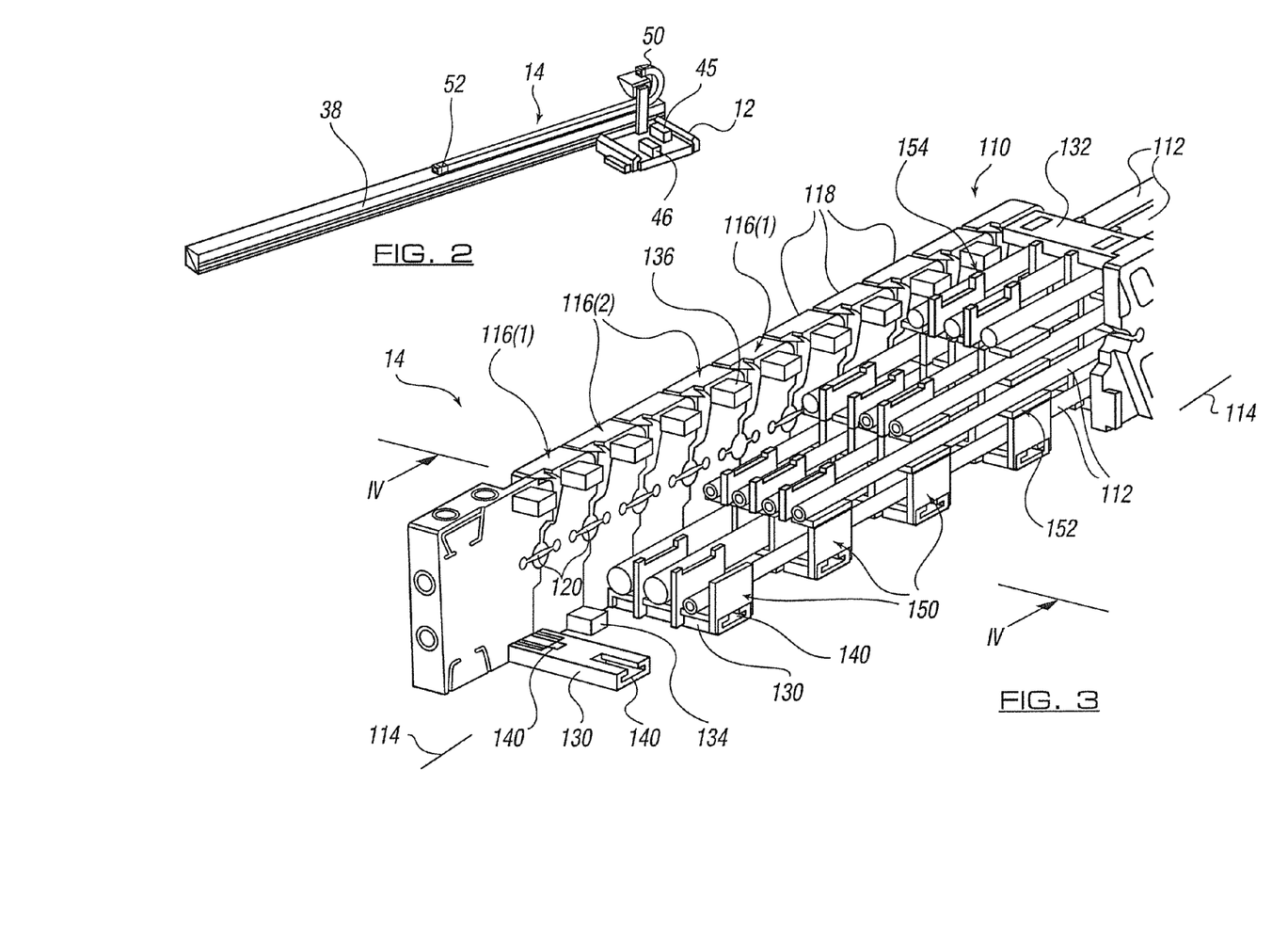
FIG. 2 is a schematic representation of a carriage and delivery chain of the printing apparatus.
FIG. 3 is a perspective view of the delivery chain with side aspects removed to reveal internal features.

Referring to FIG. 2, the carriage 12 may be mounted for linear reciprocating movement along a rail 38. The rail 38 has a longitudinal axis that defines a scan axis of the carriage. The carriage 12 may carry a motor 45 that drives a drive member that interacts with the rail 38 or another member in the printing apparatus to cause the carriage to move along the rail. The carriage 12 may also carry a printhead 46 configured to deliver a coating material, for example an ink or paint, onto print media transported by the media transport 20. The carriage may comprise multiple printheads. However, for economy of presentation, in the description that follows reference will be made to a printhead in the singular and unless the context otherwise demands, this is to be taken as covering both the singular and the plural.

As described in detail below with reference to FIGS. 3 to 10, the delivery chain 14 comprises transmission lines that transmit, or convey, electrical power, commands and data to the motor 45 or printhead 46 and a coating fluid to the printhead and a transmission line guide chain that restrains, guides and protects the transmission lines. The delivery chain 14 is connected at a first end 50 to the carriage 12 and at a second end 52 to the source 16 (FIG. 1). The source 16 may comprise an interface 54 for connectors provided on the ends of the transmission lines and a reservoir 56 containing a coating fluid. The reservoir may be a refillable fixture of the printing apparatus or a replaceable cartridge or the like. A pump (not shown) may be provided as a part of the source 16 for pumping coating fluid from the reservoir to the printhead 46 via the delivery chain 14.

Referring to FIGS. 3 to 6, the delivery chain 14 comprises a transmission line guide chain 110 and a plurality of transmission lines 112. The transmission line guide chain 110 has a longitudinal axis 114. The transmission lines 112 are received in a through-passage defined by the guide chain. The through-passage is coaxial with the longitudinal axis 114. As previously described, the transmission lines 112 may comprise hoses or tubes that can be used to transmit, or convey, fluids and cables that can be used to transmit, or convey, electrical energy.

Figure 5:
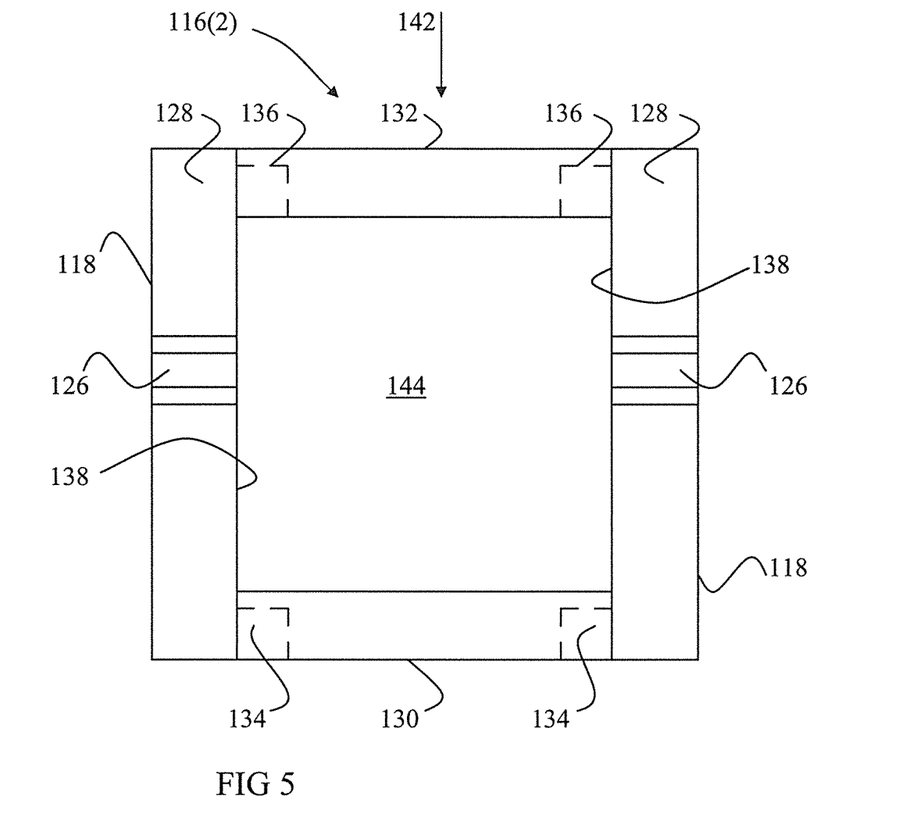
FIG. 5 is a schematic end view of a chain link of the delivery chain of FIGS. 3 and 4.
Figure 6:
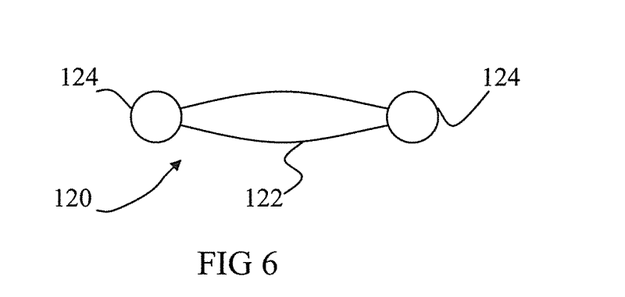
FIG. 6 is a side elevation of a coupling member of the delivery chain of FIGS. 3 and 4.

The guide chain 110 comprises a plurality of connected chain links 116(1), 116(2). The chain links 116(1), 116(2) each comprise two opposed side link members 118. Adjacent side link members 118 are connected, or coupled, in end-to-end relationship by coupling members 120. In the example illustrated by FIGS. 3 to 6, the coupling members 120 are plastics springs. As best seen in FIG. 6, the coupling members 120 comprise an elongate body 122 with respective transversely extending cylindrical bodies 124 provided at each end of the elongate body. The cylindrical bodies 124 complementarily engage circular section recesses 126 (FIG. 5) defined in the end faces 128 of the side link members 118. The configuration of the cylindrical bodies 124 and recesses 126 is such that the chain links 116(1), 116(2) can articulate by pivoting about respective pivot axes defined by the cylindrical bodies 124.

The chain links 116(1) each comprise two oppositely disposed spaced apart side link members 118. As best seen in FIG. 5, the chain links 116(2) each comprise two oppositely disposed spaced apart side link members 118 and a first transverse member 130 and a second transverse member 132. The first and second transverse members 130, 132 extend between and connect the two side link members 118. Each side link member 118 is provided with a first projection 134 and a second projection 136. The projections 134, 136 project inwardly of the guide chain 110 from an inner face 138 of the side link members 118. The first transverse member 130 is provided with respective axially extending apertures 140 (FIG. 3) at its ends. The apertures 140 are configured to receive the first projections 134 by push-fitting in the axial direction of the transverse member 134. When connected, the first transverse member 134 and two side link members 118 define a generally U-shaped body.

The second transverse member 132 is provided with respective apertures that are configured to permit the second transverse member to be push-fitted onto the second projections 136 by a movement in the direction of the arrow 142 (ie perpendicular to the longitudinal axis 114 of the transmission line guide chain 110 and parallel to the respective planes of the side link members 118). When the second transverse member 132 is fitted, the chain link 116(2) has a rectangular cross-section and defines a through-hole 144 that forms a portion (ie a part of the length) of the through-passage defined by the guide chain 110.

The first and second projections 134, 136 and the respective apertures of the first and second transverse members 134, 136 with which they mate may be configured to be a light interference fit or provided with formations that snap-fit together.

The transmission line guide chain 110 illustrated by FIGS. 3 to 6 comprises alternating chain links 116(1), 116(2). This is not essential. The transmission line guide chain may comprise just chain links 116(2). However, it may be more economic to form the transmission line guide chain from chain links 116(1), 116(2).

Figure 4:
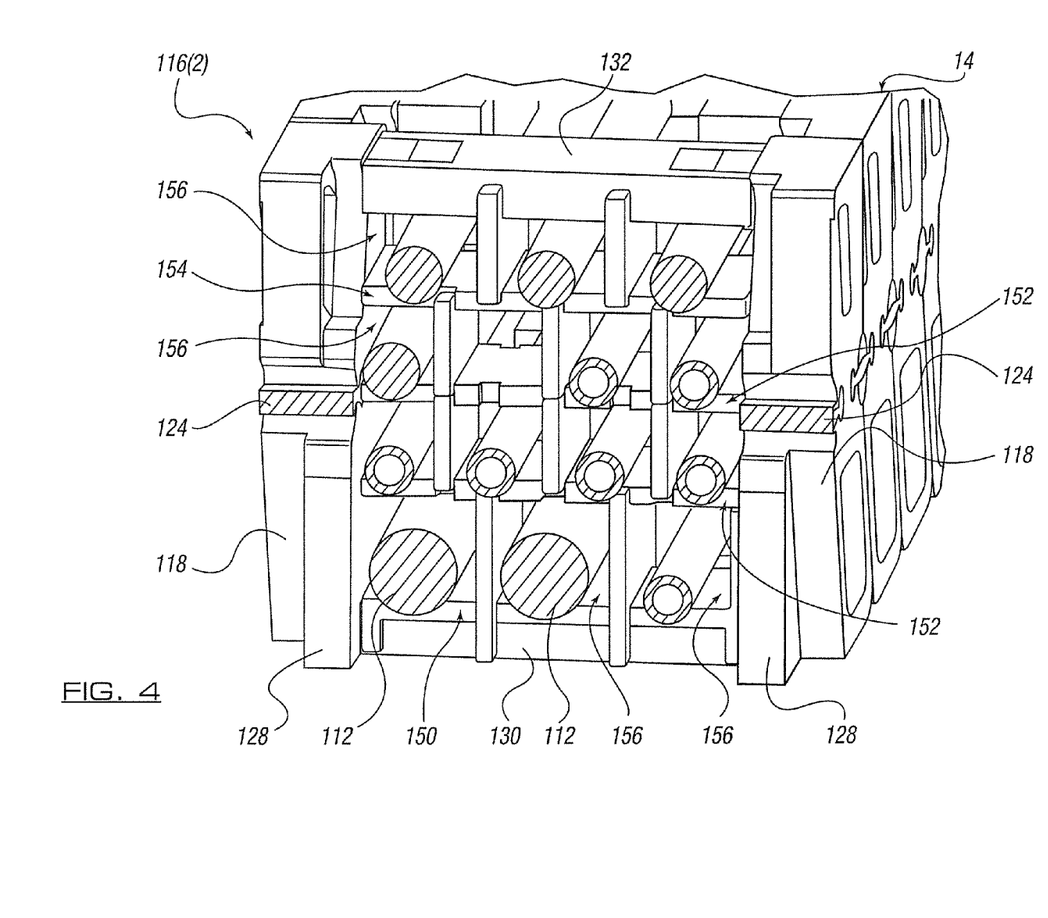
FIG. 4 is a section on line IV-IV in FIG. 3.

As shown in FIGS. 3 and 4, the chain links 116(2) are provided with dividers 150, 152, 154. The dividers 150, 152, 154 are disposed in the respective through-holes 114 of the chain links 116(2) to divide the through-holes into a plurality of compartments, or guide channels, 156 that can each receive at least one transmission line 112. Three different configurations of divider are shown and for ease of identification only, these will referred to as a first divider 150, second divider 152 and third divider 154.

Figure 7:
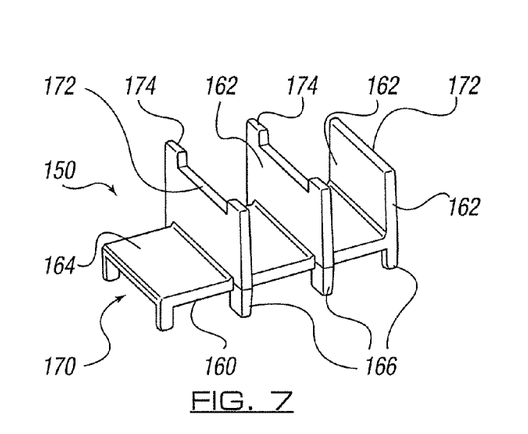
FIG. 7 is a perspective view from above of a first divider of the delivery chain of FIGS. 3 and 4.
Figure 8:
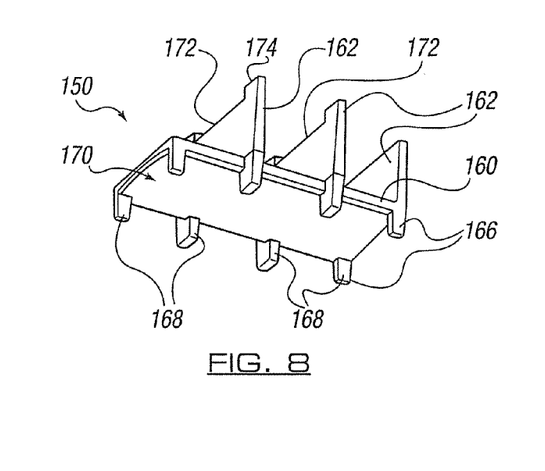
FIG. 8 is a perspective view from below of the first divider.

Referring to FIGS. 7 and 8, the first divider 150 is a unitary body comprising a transverse member 160 and a plurality of uprights 162 that project from a major face 164 of the transverse member. The uprights 162 are disposed substantially perpendicular to the transverse member 160. The first divider 150 additionally comprises formations in the form of a plurality of feet 166. The feet 166 extend in the opposite direction to the uprights 162. The feet 166 are arranged in oppositely disposed couples and their inner faces 168 are positioned to define a channel 170 that is configured to be a light interference fit on the first transverse members 134 of the chain links 116(2). The free ends of the uprights 162 are provided with a formation in the form of a recess 172 and two projections 174 that are defined by the recess. As will be described in more detail below, this formation allows the second divider 152 to be plugged onto the first divider 150.

Figure 9:
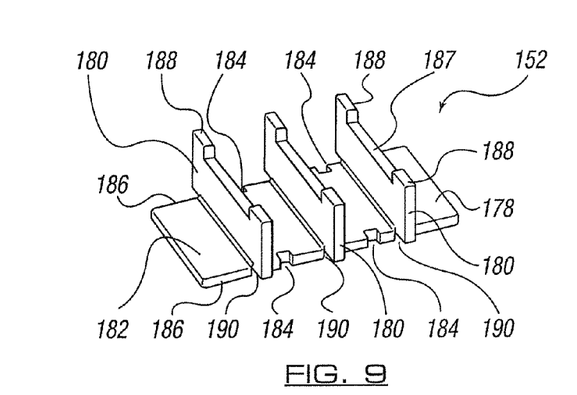
FIG. 9 is a perspective view from above of a second divider of the delivery chain of FIGS. 3 and 4.

Referring to FIG. 9, the second divider 152 is a unitary body comprising a transverse member 178 and a plurality of uprights 180 that project from a major face 182 of the transverse member. The uprights 180 are disposed substantially perpendicular to the transverse member 178. The transverse member 178 has formations in the form of recesses 184 provided in opposite edges 186 thereof. The recesses 184 are configured to receive the projections 174 of the first divider 150. That is, there is a recess 184 for each projection 174 to permit the second divider 152 to be plugged onto the first divider with the portion of the transverse member 178 that extends between opposite recesses 184 received in the recesses 172 at the free ends of the first divider uprights 162. The free ends of the second divider uprights 180 are provided with a formation in the form of a recess 187 and two projections 188 that are defined by the recess. Further formations in the form of recesses 190 are provided in the edges 186 of the transverse member 178 in line with (below as viewed in FIG. 9) the uprights 180. The recesses 190 are configured to receive the projections 188 of another second divider 152 to allow second dividers to be plugged onto one another.

Figure 10:
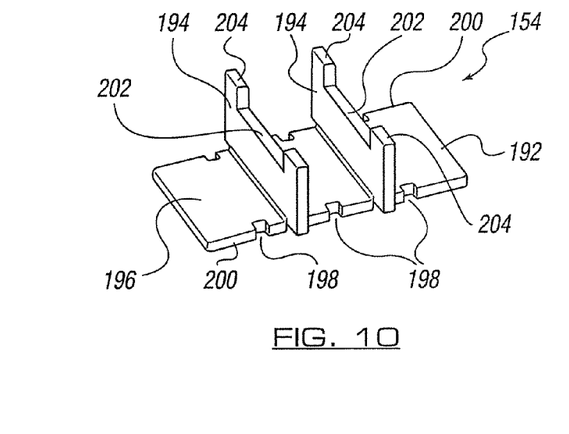
FIG. 10 is a perspective view from above of a third divider of the delivery chain of FIGS. 3 and 4.

Referring to FIG. 10, the third divider 154 is a unitary body comprising a transverse member 192 and a plurality of uprights 194 that project from a major face 196 of the transverse member. The uprights 194 are disposed substantially perpendicular to the transverse member 192. The transverse member 192 has formations in the form of recesses 198 provided in opposite edges 200 thereof. The recesses 198 are configured to receive the projections 188 of a second divider 152 to allow a third divider 154 to be plugged onto a second divider 152. The free ends of the uprights 194 are provided with a formation in the form of a recess 202 and two projections 204 that are defined by the recess. Optionally, further formations in the form of recesses may be provided in the edges 200 of the transverse member 192 in line with (below as viewed in FIGS. 10 and 11) the uprights 194. If provided the recesses would be able to receive the projections 174 of a first divider and the projections 204 of another third divider so that the third divider could be plugged onto a first divider or a third divider as desired.

The respective recesses 187, 202 provided in the free ends of the uprights 180, 194 of the second and third dividers 152, 154 are configured to receive the second transverse members 132 of the chain links 116(2). Although not essential, the recesses 187, 202 may be sized such that the portions of the transverse members 132 received are a light interference fit in the recesses. This means that the last divider of a stack may be a second or third divider 152, 154 as desired.

The dividers 150, 152, 154 may be integral bodies or fabricated from components to form a unitary body that is inserted into the through-hole 144 of a chain link 116(2) in one piece. Although not essential, the dividers 150, 152, 154 may be formed as plastics mouldings.

Figure 11:
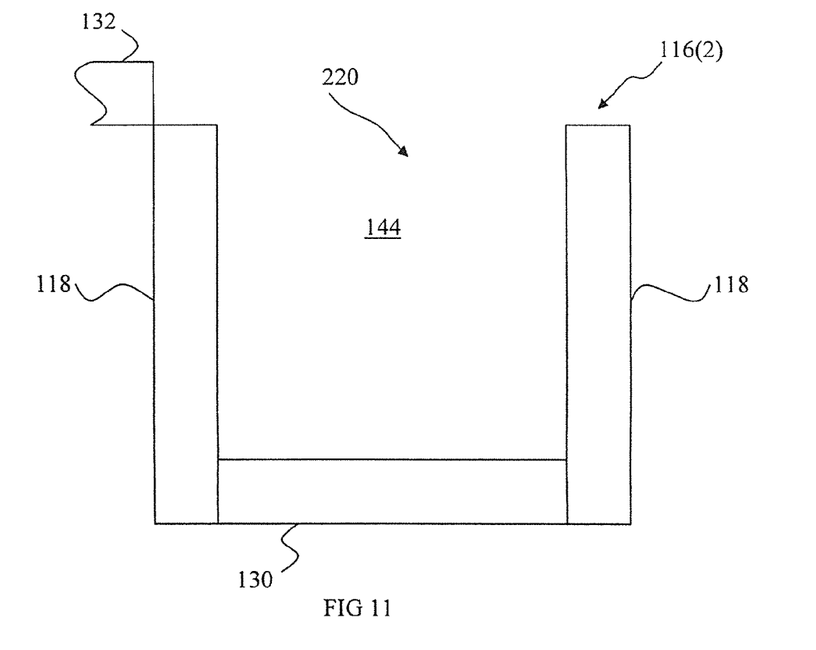
FIG. 11 is a schematic illustration of a chain link of a transmission line guide chain ready to receive a first divider of a stack of dividers.

The assembly of a stack of dividers 150, 152, 154 in the through-hole 144 of a chain link 116(2) will now be described with reference to FIGS. 11 to 14. Referring to FIG. 11 a chain link 116(2) of a transmission guide line 110 is shown with the second transverse member 132 moved to a position in which a side entry 220 to the through-hole 144 is open. In FIG. 11 the second transmission member 132 is shown connected to a side member 118 by a hinge or the like. This is one possible alternative to the configuration shown in FIG. 5 in which the second transverse member 132 is completely detached during assembly of the stack of dividers in the through-hole.

Figure 12:
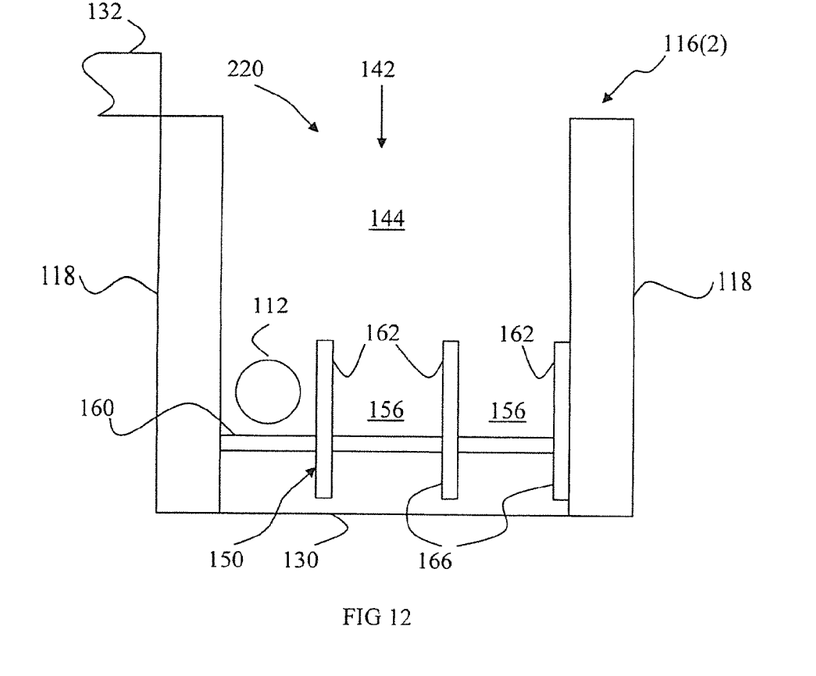
FIG. 12 is a schematic illustration of the chain link of FIG. 11 with a first divider installed.

Referring to FIG. 12, a first divider 150 has been inserted into the through-hole 144 through the side entry 220 in the direction indicated by the arrow 142. The transverse member 160 of the first divider 150 is seated on the first transverse member 130 of the chain link 116(2) with the first transverse member received in the channel 170 defined by the feet 166. The fit of the first transverse member 130 in the channel 170 is such as to at least substantially prevent movement of the first divider 150 relative to the first transverse member in the direction of the longitudinal axis 114 of the transmission line guide chain 110 (ie perpendicular to the plane of the drawing). The length of the transverse member 160 of the first divider 150 corresponds substantially to that of the first transverse member 130 so that the first divider is at least substantially prevented from moving along the first transverse member by abutment with the side members 118. The uprights 162 of the first divider 150 define three compartments 156 that can each receive at least one transmission line 112. A transmission line 112 is shown received in one of the compartments 156.

Figure 13:
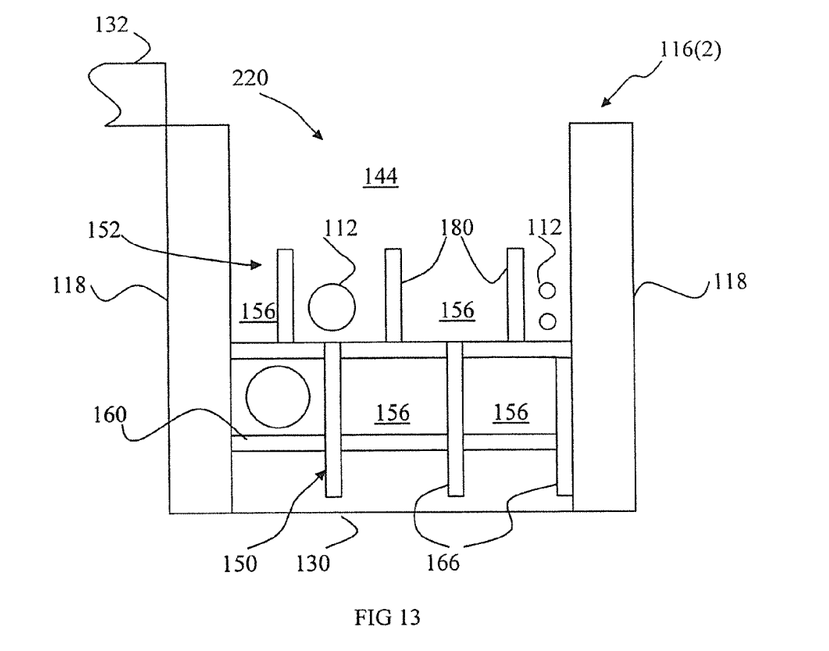
FIG. 13 is a schematic illustration of the chain link of FIG. 11 with a second divider installed.

Referring to FIG. 13, a second divider 152 has been inserted into the through-hole 144 through the side entry 220 in the direction of the arrow 142 (FIG. 12). The second divider 152 is seated on the first divider 150. The transverse member 178 of the second divider 152 is received in the recesses 172 at the free ends of the first divider uprights 162 and the projections 174 of the first divider uprights are received in respective ones of the recesses 184 in the edges of the second divider transverse member 178. The second divider 152 is thus plugged onto the first divider 150 so that movement of the second divider in the direction of the longitudinal axis 114 of the transmission line guide chain 110 and in the lengthways direction of the first transverse member 130 is at least substantially prevented by the engagement of the second divider with the first divider.

The first and second dividers 150, 152 form a stack of dividers in the through-hole 144 defining a plurality of compartments 156 that can each receive at least one transmission line 112. The two dividers 150, 152 define respective sets of compartments at different levels within the through-hole.

Figure 14:
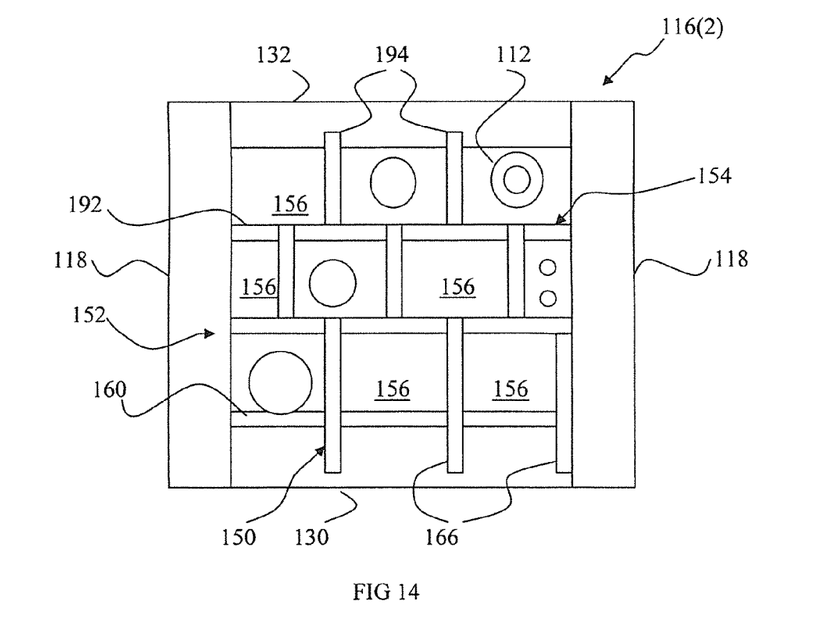
FIG. 14 is a schematic illustration of the chain link of FIG. 11 with a third chain link installed.

Referring to FIG. 14, a third divider 154 has been inserted into the through-hole 144 through the side entry 220 in the direction of the arrow 142 (FIG. 12). The third divider 154 is seated on second divider 152. The transverse member 192 of the third divider 154 is received in the recesses 187 at the free ends of the uprights 180 of the second divider 152 and the projections 188 of the second divider uprights are received in respective ones of the recesses 198 in the edges 200 of the third divider transverse member 192. The third divider 154 is thus plugged onto the second divider 152 so that movement of the third divider in the direction of the longitudinal axis 114 of the transmission line guide chain 110 and the lengthways direction of the transverse member 130 is at least substantially prevented by the engagement of the third divider with the second divider, engagement of the second divider with the first divider and the engagement of the first divider with the first transverse member. The second transverse member 132 of the chain link 116(2) has been moved back to a position in which the side entry 220 to the through-hole 144 is closed. In this position the second transverse member 132 is received in the recesses 202 at the free ends of the uprights 194 of the third divider 154. The engagement of the second transverse member 132 in the recesses 202 assists in stabilising the stack of dividers 150, 152, 154 and at least substantially preventing movement of the stack of dividers in the direction of the longitudinal axis 114 of the transmission line guide chain 110.

The addition of the third divider 154 to the stack of dividers provides a three divider stack in the through-hole 144. The three divider stack divides the through-hole into three levels, or layers, of compartments 156. Each compartment 156 can receive at least one transmission line 112. For ease and clarity of presentation, most of the compartments 156 are shown in FIGS. 11 to 14. Although it may be possible to thread transmission lines 112 into the compartments 156 after the stack of dividers has been formed, conveniently, the compartments defined by the first divider 150 are loaded with transmission lines prior to seating the second divider 152 on the first divider and the compartments defined by the second divider are loaded prior to seating the third divider 154 on the second divider.

Thus, the chain link 116(2) illustrated by FIGS. 11 to 14 includes a system of dividers 150, 152, 154 that are configured to be seated one upon another in the through-hole 144 of a chain link to form a stack of dividers that divides the through-hole into a plurality of compartments, or guide channels, 156 that can each receive at least one transmission line 112. The first dividers 150 are configured to plug onto the first transverse member 130 of a chain link 116(2). The second dividers 152 are configured to be plugged onto a first divider 150, another second divider or a third divider 154. The third dividers are configured to be plugged onto a second divider and may optionally be configured to seat on a first divider or another third divider. This provides considerable flexibility in configuring the layout of the compartments within the through-hole. For example, the second dividers 152 provide a larger number of relatively smaller compartments than the third dividers 154. Thus, for some applications, it may be desirable to have a stack of dividers made up of just first and second dividers in order to provide a larger number of compartments. For other applications, it may be desirable to have a stack of dividers comprising just first and third dividers to provide a smaller number of relatively larger compartments. From the foregoing, it will be understood that the labels 'first', 'second' and 'third' applied to the dividers 150, 152, 154 are used merely for ease of identification and do not limit the application of the dividers to an arrangement comprising a first divider 150, second divider 154 and third divider 154 in that order or require that a stack of dividers need comprise an example of each of the three dividers 150, 152, 154.

Figure 15:
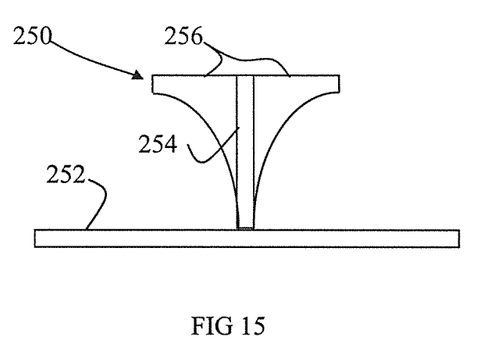
FIG. 15 is a front elevation of another transmission line guide chain divider.
Figure 16:
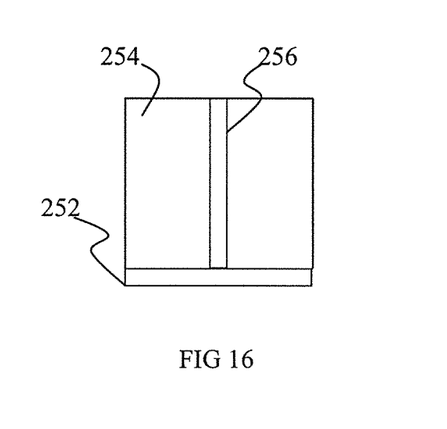
FIG. 16 is a side elevation of the divider of FIG. 15.

For some applications it may be desirable to have a divider that has just one upright so that the divider defines just two side by side compartments. This may be desirable if relatively large transmission lines are to be received in the transmission line guide chain. An example of a divider 250 having just one upright is shown in FIGS. 15 and 16. The divider 250 comprises a transverse member 252 and an upright 254. The upright 254 extends substantially perpendicular to the transverse member 252. The divider may have feet to allow it to seat on a first transverse member 130 of a chain link 116(2) in similar fashion to the divider 150. Alternatively, the divider 250 may be provided with formations in the sides of the transverse member 252 to enable the divider to be plug fitted to other dividers in similar fashion to the dividers 152, 154. If the divider 250 is intended to be the last divider in a stack of dividers, the free end of the upright 254 may be provided with a recess defining projections in similar fashion to the dividers 150, 152, 154. Alternatively, if it is intended that the divider 250 is to be able to support other dividers, such as the dividers 152, 154, respective side supports 256 may be provided on the sides of the upright 254. The side supports 256 may extend substantially perpendicular to the upright 254 and may be located on a centre line of the transverse member 252. The side supports 256 may be rectangular section beams cantilevered from the free end of the upright or incorporate a fillet support that may have an arcuate profile as shown. The upright 254 and side supports 256 may plug into a suitably sized crucifix aperture in the underside of a divider that is to seat on the divider 250. However, this is not essential. For example, the free end of the upright 254 may be provided with a formation in the form of a recess defining projections in the similar fashion to the dividers 152, 154 so that it can plug fit with such dividers in the way described above in connection with FIGS. 7 to 14.

Figure 17:
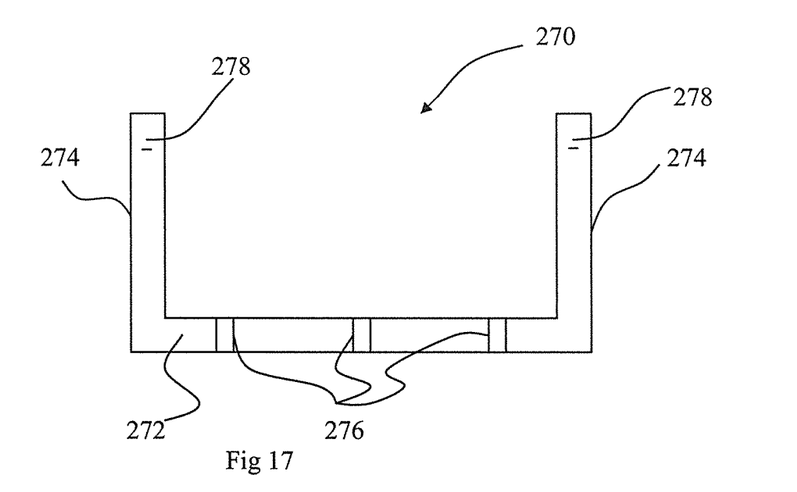
FIG. 17 is a front elevation of yet another divider.

For some applications it may be desirable to have a divider that is configured to define a single compartment that extends across substantially the entire width of a chain link. This may be desirable if a relatively wide transmission line is to be received in a transmission line guide chain. An example of a divider 270 that is configured to define just one compartment is shown in FIG. 17. The divider 270 comprises a transverse member 272 and two uprights 274. The uprights 274 extend substantially perpendicular to the transverse member 272. The uprights 274 are disposed at opposite ends of the transverse member 272 and in use are disposed adjacent to and face to face with the side link members 118 of a chain link 116(2) in which the divider 270 is installed. The divider 270 may have feet to enable the divider to seat on a first transverse member 130 of a chain link 116(2) in similar fashion to the divider 150. Alternatively, the divider 270 may be provided with formations in the edges of transverse member 272 in similar fashion to the dividers 152, 154. In the illustrated example, the divider 270 is shown with formations in the form of recesses or notches 276 min the opposite edges of the transverse member 272 in similar fashion to the divider 154 so that the divider 270 can plug onto the uprights of a second divider 152 in similar fashion to the divider 154. The free end of each upright 274 is provided with a recess 278 defining projections in similar fashion to the dividers 150, 152, 154.

In the illustrated examples, the divider systems comprise three configurations of divider that are assembled into divider stacks that comprise three (FIG. 14) or four dividers (FIG. 4) that divide the through-hole of a chain link into respective layers of compartments. This is not essential and for some applications more than three configurations of divider may be provided and the number of layers may be two or more than four. The divider system provides considerable flexibility in providing a divider stack configured for particular applications requiring a greater or lesser number of compartments.

In the illustrated examples, the uprights of the dividers have the same height so that each layer of compartments has the same height. This is not essential. It may be desirable to have at least one or more divider that has relatively shorter uprights. For example, a divider with uprights that are approximately half the height of the uprights of the other dividers may be provided to allow the possibility of providing additional layers of compartments for the same size of through hole. In one example, a modification of the divider 270 comprises reducing the height of the uprights 274 to define a relatively wide but shallow compartment suitable for receiving wide flat transmission lines such as, for example, ribbon cables.

In the illustrated examples, the dividers can be plugged onto one another by means of recesses defined in the edges of the transverse member and a formation comprising a recess defining projections provided in the free ends of the uprights. This is not essential. For example, apertures disposed away from the edges of the transverse member of a divider may be provided in the face of the transverse members that is disposed opposite the face from which the uprights project to mate with complementary projections provided on the free ends of the uprights. The apertures may be circular apertures configured to mate with pins projecting from the free ends of the uprights.

Figure 18:
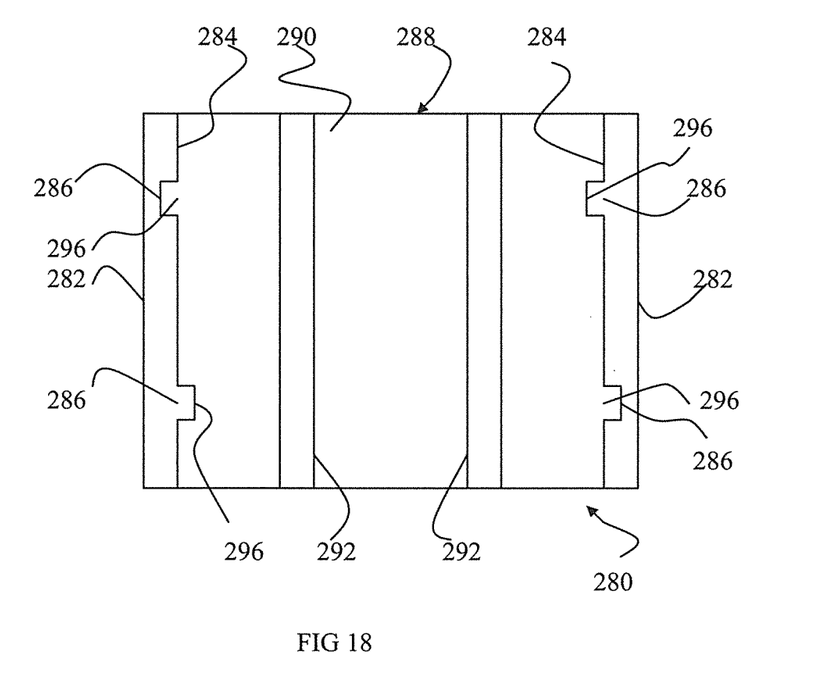
FIG. 18 is a view from above of a chain link and a divider of another delivery chain.
Figure 19:
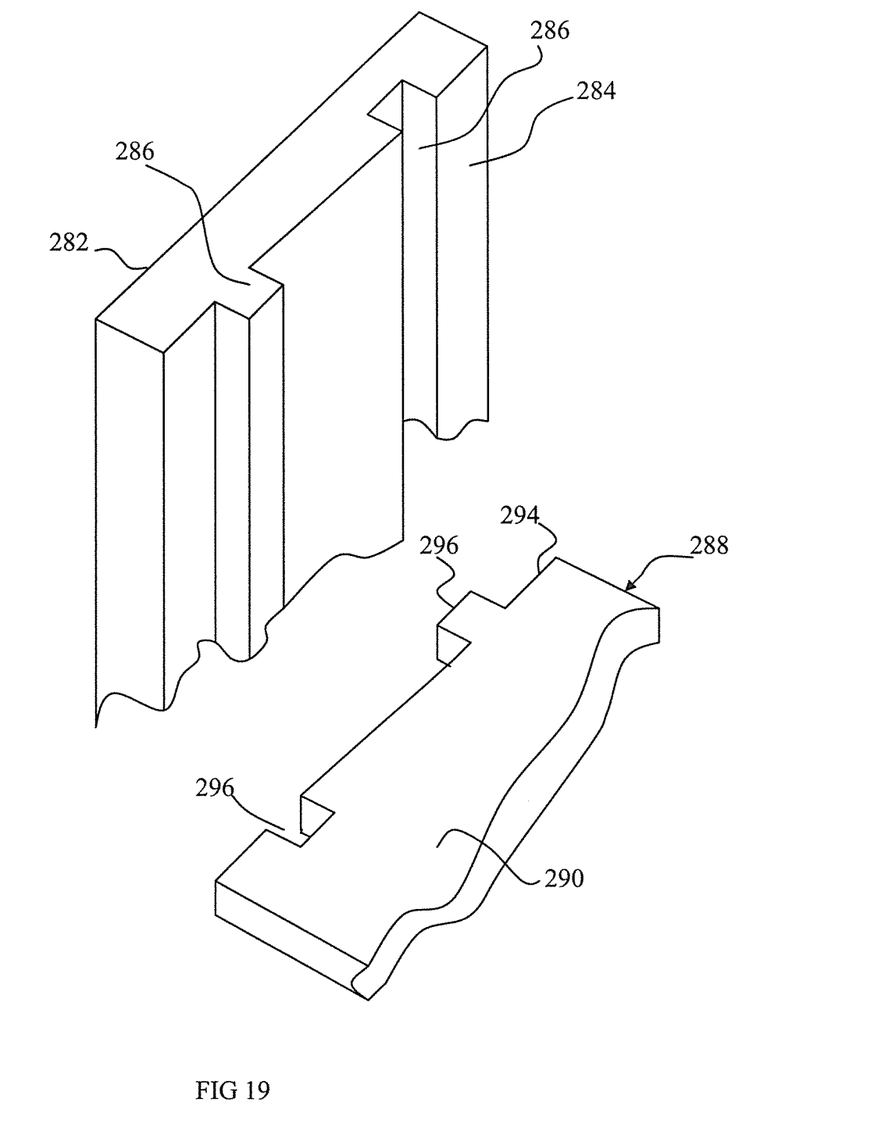
FIG. 19 is a partial perspective view of the chain link and divider of FIG. 18.

In another example illustrated by FIGS. 18 and 19, the dividers do not plug onto one another or onto the first and second transverse members 130, 132 of a chain link in which they are stacked. Referring to FIGS. 18 and 19, a chain link 280 comprises opposed side link members 282. Although not shown, the chain link 280 has first and second transverse members (not shown) that extend between the two side link members 282 in similar fashion to the first and second transverse members 130, 132 of the chain link 116(2) so as to define a through hole that forms a portion (ie a part of the length) of a through-passage of a guide chain that includes the chain link 280. One of the transverse members may be integral with the two side link members 282 to define a generally U-shaped part.

The inner faces 284 of the chain side link members 282 are provided with formations in the form of rails or grooves 286. A divider 288 to be fitted in the through hole defined by the chain link 280 comprises a transverse member 290 that in use extends between the inner faces 284 of the side link members 282 and a plurality of uprights 292. The opposite ends 294 of the transverse member 290 are provided with formations in the form of recesses or projections 296 to complementarily engage the rails or grooves 286. The engagement of the recesses or projections 296 with the rails or grooves 286 substantially secures the dividers against movement in directions parallel to the longitudinal axis of the transmission line guide chain. A limited amount of such movement is desirable to provide clearance to allow the dividers to slide into the chain link with minimal resistance.

A divider 288 can be assembled into the guide chain link 280 in similar fashion to the example described with reference to FIGS. 11 to 14 by inserting the divider through an open side of the chain link. The projections/recesses 296 of the divider 288 complementarily engage the rails/grooves 286 to allow the divider to be slid into the through hole until the transverse member seats on the first transverse member of the chain link or the upright(s) of a divider below. A stack of dividers 288 can be assembled into the chain link 280 in similar fashion to the stacks shown in FIG. 4 and FIGS. 11 to 14. The stacks of dividers shown in FIG. 4 and FIGS. 12 to 14 have dividers at each end of the stack that respectively plug fit to the first and second transverse members of the chain link and intermediate dividers that plug fit to one another. This plug fitting locates and secures the dividers in the through hole of the chain link. In the example illustrated by FIGS. 18 and 19, engagement between the dividers and the formations provided on the chain side link members is sufficient to locate and secure the dividers in the chain link so there is no need for the dividers to inter-engage one another or the transverse members of the chain link.

The example illustrated by FIGS. 18 and 19 provides the potential for a simple system of dividers in which each divider is simply provided with formations to engage formations on the inner faces of side link members 282 of a chain link 280. Thus, the formations provided on each divider can be identical and do not have to be configured to cooperate with differing formations provided on other dividers. This means that, for example, a system of dividers having different configurations of uprights, for example different numbers or heights of uprights, can be provided with each divider having a common configuration of transverse member. The uprights of the dividers can be configured to provide desired configurations of compartment(s) with no need to take account of engaging other dividers or a chain link in which they are fitted.

The respective formations on the side link members and dividers can be handed as illustrated in FIGS. 18 to 19 so that the dividers can only be inserted in one orientation. This can be achieved by having different types of formation as illustrated, or having an asymmetric arrangement. For example if the inner faces 284 of the side link members 282 are provided with one or more formations in the form of just rails or grooves, these may be configured so that the corresponding dividers will only fit within the through hole defined by a chain link in one particular orientation. Alternatively the configuration of the formation(s) provided on the side link member and the corresponding formation(s) provided on the divider may be such that the divider can be inserted either way around. This may be desirable if the uprights define a symmetric arrangement of compartments so that correct orientation of the dividers is not necessary.

Where the formation(s) provided on the side link member 282 is a groove, the groove extends from the upper end of the side link member and may extend over the full height of the side link member. If the formation(s) provided on the side link member take(s) the form of projections only, it is not essential to have a continuous formation such as the rails illustrated in FIGS. 18 and 19. Instead, a series of discrete projections could be provided positioned at heights corresponding to the heights at which respective dividers are intended to be seated. However, a continuous rail or projection as shown has the potential advantage of providing greater flexibility in terms of the heights at which dividers can be seated within the chain link and can assist in guiding the insertion of the dividers.

For economy of presentation, variations in the configuration of the uprights of different dividers that may be used in a chain link such as the chain link 280 will not be described in detail herein other than to say that the height and number of uprights can be freely selected within the constraint of providing dividers sized such that they can form a stack of two or more dividers within a through hole of a chain link.

Although not shown in FIGS. 18 and 19, if the side link members 282 of the chain link 282 have projections corresponding, or similar, to the second projections 136 of the chain links 116(2), the transverse member 290 of the dividers 288 is provided with recesses at its ends 294 to provide clearance for the projections. For divider systems the same as, or similar to, the system illustrated by FIGS. 18 and 19 it may be preferable to avoid having a projection corresponding to the second projections 136. This may, for example be achieved by providing recesses in the side link members 282 that are engageable by projections provided on ends of the corresponding transverse member of the chain link. Alternatively, other forms of connection, which may include hinges, pegs in the underside of the transverse member or upper end of the chain side link member may be used.

In the illustrated examples, the dividers have at least one upright and the or each upright extends substantially perpendicular to a transverse, or base, member of the divider. This is not essential. The uprights may be inclined with respect to the transverse members to define one or more compartments that are trapezoidal rather than rectangular in cross-section. Also, in the illustrated example the major surfaces from which the uprights extend are at least substantially planar. In some examples the major surface may be provided with grooves extending generally parallel to the uprights and the longitudinal axis of the transmission line guide chain.

The dividers are configured to permit the division into compartments, or guide channels, of a through-hole of a chain link of a transmission line guide chain in a way that is simple and speedily accomplished. As illustrated by FIGS. 11 to 14, the dividers may be inserted through a side entry of the chain link and seated one upon another to form a stack by one simple insertion movement for each divider. Furthermore, no tools, specialised or otherwise, are required in order to assemble the stack of dividers as the dividers can simply be placed one on top of another. In tests it has been found that an example of a transmission line guide chain with a divider system as illustrated by FIGS. 3 to 10 can be assembled by one operative in just thirty minutes. A corresponding transmission line guide chain assembled using a known system of separators comprising individual transverse and upright members assembled one by one within the guide chain took two operatives a total of four hours to assemble. Thus, a time reduction in terms of operative hours of 93.75% may be achieved.

If a transmission line in a delivery chain fails, or needs to be substituted by a different type of transmission line, it is usually necessary to disassemble the delivery chain. This is because the connectors on the end of the transmission lines may be too large to be pulled through the transmission line guide chain. Even in cases in which a connector is small enough to allow it to be drawn through the transmission line guide chain, it may still not be practicable to withdraw a transmission line by drawing it through the guide chain as the connector may snag on edges of components of the transmission line guide chain. Accordingly, where a transmission line is to be changed for any reason disassembly of the delivery chain is needed.

In known transmission line guide chains, disassembly to release a transmission line necessitates disassembling the entire separator system and set of transmission lines from the transmission line guide chain and then completely reassembling the structure. This can be very time consuming and may require special tools. It may also be particularly difficult if the work is carried out on site, for example, when an apparatus has broken down. Utilising divider systems as illustrated by, for example, FIGS. 3 to 14 or 18 and 19 reduces the likelihood of having to disassemble the entire structure and requires no special tools. This makes repair to an apparatus on site easier. For example, referring to FIG. 14, if one of the transmission lines in the layer, or level, of compartments defined by the divider 152 is to be changed, all the operative needs to do is open the side entry 220 by suitable manipulation of the second transverse member 132 and remove the three transmission lines received in the compartments defined by the divider 154 and the divider 154 itself. The transmission line 112 that is to be changed can then be accessed and replaced and the delivery chain reassembled by reversing those steps. Thus, the replacement of the transmission line may be achieved without disassembly of the entire structure, thereby saving considerable operative time in both the disassembly and reassembly stages.

In the illustrated examples, the stack of dividers is shown disposed in a chain link of a transmission line guide chain in which the chain links are connected end to end by coupling members that extend between the ends of the adjacent chain links in a direction parallel to the longitudinal axis of the transmission line guide chain. This is not essential. A system of stacking dividers as illustrated by, for example FIG. 4 or FIG. 14, is not limited to use in any particular configuration of transmission line guide train. Rather, the provision of dividers that may form a stack of dividers in a through-passage of a transmission line guide chain to define compartments, or guide channels, in the through-passage is applicable to transmission line guide chains generally. Thus, for example, the through-passage of a transmission line guide chain that has overlapping side members that are connected by coupling members that extend perpendicular to the longitudinal axis of the transmission line guide chain can be achieved.

In the example illustrated in FIG. 3, stacks of dividers are formed in alternate chain links. This is not essential and, for example, stacks of dividers may be formed in each chain link.

The use of a plurality of dividers that are stacked in the through-passage of a transmission line guide chain makes it possible to assemble a delivery chain simply by disposing layers of transmission lines within the through-passage of the transmission line guide chain one after another. For example, a divider is seated in the through passage and then a layer of transmission lines is formed in the through-passage by disposing the transmission lines in the compartments, or guide channels, defined by the divider. Once the layer is complete, another divider is seated on that divider and the next layer of transmission lines is formed by disposing transmission lines in its compartments, or guide channels. In this way, the dividing of the through-passage into compartments for the transmission lines and assembly of the transmission lines within the transmission line guide channel can be accomplished easily in stages, layer by layer.

The insertion of the dividers into the chain links of the transmission line guide chain and the insertion of the transmission lines into the compartments, or guide channels, defined by the dividers requires only simple movements that may be substantially uni-directional. The insertion may be through a side entry that has a width at least substantially equal to the width of the transmission line guide chain. The insertion may be made from above with the transmission line guide chain supported from beneath by a work platform. One or more of these features makes the assembly process relatively simple for a human operative and may make it possible to at least semi-automate the assembly process using robots or the like.

A transmission line guide chain incorporating a system of stacking dividers may be used in a printing apparatus, for example a wide format printer, or in machinery generally in which transmission lines connected at one end with a stationary source have their other end connected with a movable unit, for example, a 'hand' of a robot or a movable unit in an assembly machine.

Transmission lines may be supplied with a plurality of stacking dividers or kits of stacking dividers may be provided separately, for example, for retrofitting to existing delivery chains.

The invention claimed is:

1. A transmission line guide chain comprising:
 a plurality of connected chain links that define a through-passage to receive transmission lines, said through-passage having a longitudinal axis and said chain links comprising a first chain link that defines a through-hole that forms a portion of said through-passage;
 a first divider disposed in said through-hole, said first divider being formed of a first transverse member that extends across a width of the through-hole and a plurality of first uprights that project from a major surface of the first transverse member; and
 a second divider formed of a second transverse member and a plurality of second uprights that project from a major surface of the second transverse member, wherein the second transverse member is removably seated on top of said plurality of first uprights of the first divider, and wherein each of the plurality of second uprights extends in a direction that is non-collinear with any of the plurality of first uprights, to provide a stack of dividers in said through-hole that divides said through-hole into a plurality of compartments.

2. The transmission line guide chain as claimed in claim 1, wherein said first and second dividers define respective compartment layers that each comprises at least one said compartment.

3. The transmission line guide chain as claimed in claim 1, wherein each of the plurality of first uprights includes a recess on respective distal ends and wherein the second transverse member is seated in the recesses of the plurality of first uprights.

4. The transmission line guide chain as claimed in claim 3, wherein each of said plurality of first uprights is provided with a first formation and said second transverse member of said second divider is provided with a second formation and said first and second formations are to interengage when said second transverse member is seated in the recesses of the plurality of first uprights on said first divider to at least substantially prevent movement of said second divider relative to said first divider in directions parallel to said longitudinal axis.

5. The transmission line guide chain as claimed in claim 1, wherein:
 said first chain link comprises opposed side members and a bottom transverse member that extends between said side members and a top transverse member that is spaced apart from said first transverse member and extends between said side members; and
 said first divider comprises a first formation to complementarily engage said bottom transverse member.

6. The transmission line guide chain as claimed in claim 5, wherein said first formation in the first divider comprises a channel that extends along a length of the first divider, and wherein the bottom transverse member is inserted into the channel.

7. The transmission line guide chain as claimed in claim 1, wherein said first chain link comprises opposed spaced apart side members, wherein the side members are each provided with formations that are releasably engageable by complementary formations provided on said first and second dividers to substantially secure said first and second dividers against movement in directions parallel to said longitudinal axis.

8. The transmission line guide chain as claimed in claim 1, wherein said first chain link comprises a member that is at least partially releasably connected with said first chain link so as to be movable with respect to said first chain link from a closed position in which a side entry to said through-hole is closed to an open position in which said side entry is open to permit insertion of said first and second dividers into said through-hole through said side entry in a direction transverse to said longitudinal axis.

9. The transmission line guide chain as claimed in claim 8, wherein said second divider is provided with a formation that is to interengage said member when said member is in said closed position.

10. The transmission line guide chain as claimed in claim 1, wherein said first chain link comprises opposed side members, wherein each of the opposed side members includes a recess to receive an end of a coupling member, wherein each of the opposed side members is to pivot about a respective pivot axis defined by the end of the coupling member.

11. A transmission line guide chain comprising:
a plurality of connected chain links that define a through-passage to receive transmission lines, said through-passage having a longitudinal axis and said chain links comprising a first chain link that defines a through-hole that forms a portion of said through-passage;
said first chain link comprising opposed side members and a bottom transverse member that extends between said side members and a top transverse member that is spaced apart from said first transverse member and extends between said side members;
a first divider disposed in said through-hole, wherein the first divider comprises a plurality of first uprights and a channel, wherein the channel extends along a length of the first divider, and wherein the bottom transverse member is complementarily engaged within the channel; and
a second divider removably seated on top of the plurality of first uprights of the first divider to form a stack of dividers that divide said through-hole into a plurality of guide channels.

12. The transmission line guide chain as claimed in claim 11, wherein said second divider is to be plug fit with said first divider when seated on said first divider.

13. The transmission line guide chain as claimed in claim 11, wherein the second divider comprises a second transverse member and wherein each of said plurality of first uprights is provided with a first formation and said second transverse member of said second divider is provided with a second formation and said first and second formations are to interengage when said second transverse member is removably seated on top of the plurality of first uprights on said first divider to at least substantially prevent movement of said second divider relative to said first divider in directions parallel to said longitudinal axis.

14. A method of assembling a delivery chain that comprises a transmission line guide chain, wherein said transmission line guide chain comprises a chain link that defines a through-hole, said chain link comprising opposed side members and a bottom transverse member that extends between said side members and a top transverse member that is spaced apart from said first transverse member and extends between said side members, and said method comprises:
disposing a first divider in said through-hole to define first guide channels in said through-hole, wherein the first divider comprises a plurality of first uprights and a channel, wherein the channel extends along a length of the first divider, and wherein disposing the first divider further comprises disposing the first divider in direct contact with the bottom transverse member by inserting the bottom transverse member into the channel; and
disposing a second divider on said plurality of first uprights of the first divider to form a stack of dividers in said through-hole of said first chain link, wherein said second divider defines second guide channels in said through-hole.

15. A method of assembling a delivery chain as claimed in claim 14, wherein each of the plurality of first uprights includes a recess on respective distal ends and wherein disposing said second divider further comprises disposing the second divider to be seated in the recesses of the plurality of first uprights.

* * * * *